(12) United States Patent
Suzuki et al.

(10) Patent No.: US 6,664,347 B2
(45) Date of Patent: Dec. 16, 2003

(54) POLYBUTADIENE AND PROCESS FOR PRODUCING THE SAME

(75) Inventors: Michinori Suzuki, Chiba (JP); Masato Murakami, Chiba (JP)

(73) Assignee: Ube Industries, Ltd., Yamaguchi (JP)

( * ) Notice: Subject to any disclaimer, the term of this patent is extended or adjusted under 35 U.S.C. 154(b) by 0 days.

(21) Appl. No.: 10/234,391

(22) Filed: Sep. 5, 2002

(65) Prior Publication Data
US 2003/0045657 A1 Mar. 6, 2003

Related U.S. Application Data

(62) Division of application No. 09/875,052, filed on Jun. 7, 2001, now abandoned.

(30) Foreign Application Priority Data

Jun. 8, 2000 (JP) ......................................... 2000-171553
Feb. 5, 2001 (JP) ......................................... 2001-27779

(51) Int. Cl.$^7$ ............................... C08F 4/06; C08F 4/72; C08F 4/02; C07F 7/00
(52) U.S. Cl. ........................... 526/118; 526/90; 526/93; 526/108; 526/116; 526/117; 526/125.1; 526/340.4; 502/117
(58) Field of Search .......................... 526/90, 93, 108, 526/116, 117, 118, 125.1, 340.4; 502/117

(56) References Cited

U.S. PATENT DOCUMENTS

| | | | |
|---|---|---|---|
| 4,072,807 A | 2/1978 | Uraneck et al. | |
| 5,064,910 A | 11/1991 | Hattori et al. | |
| 5,905,125 A | 5/1999 | Tsujimoto et al. | |
| 6,069,213 A | * | 5/2000 | Nemzek et al. ............. 526/113 |

FOREIGN PATENT DOCUMENTS

| | | |
|---|---|---|
| EP | 0 919 574 | 6/1999 |
| JP | 5-051406 | 3/1993 |
| JP | 8-208751 | 8/1996 |
| JP | 9-291108 | 11/1997 |
| JP | 10-306113 | 11/1998 |

* cited by examiner

*Primary Examiner*—James J. Seidleck
*Assistant Examiner*—Olga Asinovsky
(74) *Attorney, Agent, or Firm*—Young & Thompson

(57) ABSTRACT

Modified polybutadiene having a high-cis and low-trans structure with a moderate 1,2-structure content and exhibiting improved characteristics such as cold flow properties, which is obtained by modifying starting polybutadiene having a $Tcp/ML_{1+4}$ ratio (Tcp: 5% toluene solution viscosity at 25° C. $ML_{1+4}$: Mooney viscosity at 100° C.) of 2.5 or more in the presence of a transition metal catalyst.

6 Claims, No Drawings

POLYBUTADIENE AND PROCESS FOR PRODUCING THE SAME

This application is a division of application Ser. No. 09/875,052, filed on Jun. 7, 2001, the entire contents of which are hereby incorporated by reference ABANDONED.

BACKGROUND OF THE INVENTION

1. Field of the Invention

The present invention relates to polybutadiene having a controlled microstructure and a controlled linearity and to a process of producing the same.

2. Description of the Related Art

Polybutadiene has such a microstructure in which a structural unit produced by polymerization at the 1- and 4-positions (1,4-structure) and a structural unit produced by polymerization at the 1- and 2-positions (1,2-structure) are co-present in the molecular chain. The 1,4-structure is divided into a cis-structure and a trans-structure. The 1,2-structure has a vinyl group as a side chain.

It is known that the microstructure of polybutadiene varies depending on the polymerization catalyst used, and polybutadiene species having different microstructures find their respective uses according to their characteristics.

In particular, polybutadiene having high molecular linearity is excellent in abrasion resistance, heat generation resistance and impact resilience. Molecular linearity of a polymer can be represented by $Tcp/ML_{1+4}$, wherein Tcp is a 5% toluene solution viscosity at 25° C., and $ML_{1+4}$ is a Mooney viscosity at 100° C. Tcp represents the degree of molecular entanglement in a thick solution. The greater the $Tcp/ML_{1+4}$ ratio, the higher the linearity with a smaller degree of branching.

The present inventors previously discovered that a polybutadiene having a high cis-/low trans-structure with a moderate 1,2-structure content and a high molecular linearity can be produced by using a polymerization catalyst comprising a metallocene type complex of vanadium and an ionic compound composed of a non-coordinating anion and a cation and/or an aluminoxane as disclosed in JP-A-9-291108. Having excellent characteristics, this polybutadiene is expected for application to high impact polystyrene, tires, etc. but, because of its relatively high cold flow, improvement is required for storage or transportation in some applications.

On the other hand, JP-A-5-52406 discloses a process of producing a conjugated diene having a branched structure, which comprises polymerizing a conjugated diene in the presence of a composite catalyst composed of an organic compound of a rare earth element, an organoaluminum compound, and a halogen-containing Lewis acid and adding a coupling agent such as an ester of a carboxylic acid with an alcohol or a phenol.

JP-A-8-208751 teaches that treatment of diene rubber obtained by polymerization using a neodymium catalyst with a chlorinated sulfur compound brings about improvements on cold flow properties and smell of rubber.

SUMMARY OF THE INVENTION

An object of the present invention is to provide polybutadiene having a high-cis and low-trans structure with a moderate 1,2-structure content and exhibiting improved characteristics such as cold flow properties and a process for producing the same.

The present invention provides modified polybutadiene obtained by modifying starting polybutadiene in the presence of a transition metal catalyst, the starting polybutadiene having a $Tcp/ML_{1+4}$ ratio, wherein Tcp is a 5% toluene solution viscosity at 25° C., and $ML_{1+4}$ is a Mooney viscosity at 100° C., of 2.5 or more.

The present invention also provides the following processes for the production of the modified polybutadiene described above:

(1) A process comprising preparing starting polybutadiene having a $Tcp/ML_{1+4}$ ratio of 2.5 or more by using a catalyst system comprising (A) a metallocene type complex of a transition metal and (B) at least one of (B1) an ionic compound composed of a non-coordinating anion and a cation and (B2) an aluminoxane and modifying the starting polybutadiene by addition of a transition metal catalyst.

(2) A process comprising preparing starting polybutadiene having a $Tcp/ML_{1+4}$ ratio of 2.5 or more by using a catalyst system comprising (A) a metallocene type complex of a transition metal, (B1) an ionic compound composed of a non-coordinating anion and a cation, (C) an organometallic compound of an element of the group 1 to 3 of the Periodic Table, and (D) water and modifying the starting polybutadiene by addition of a transition metal catalyst.

DETAILED DESCRIPTION OF THE INVENTION

The starting polybutadiene which can be used in the present invention has a 1,2-structure content of 4 to 30%, preferably 5 to 25%, still preferably 7 to 15%; a cis-1,4-structure content of 65 to 95%, preferably 70 to 95%, still preferably 70 to 92%; and a trans-1,4-structure content of not more than 5%, preferably 4.5% or less, still preferably 0.5 to 4%.

If the microstructure of the starting polybutadiene is outside the above defined range, the modified polybutadiene derived therefrom leaves something to be desired in reactivity in grafting, crosslinking, etc. Further, it has insufficient rubbery properties for use a modifier additive, adversely affecting the balance of physical properties and external appearance of matrices.

The toluene solution viscosity (Tcp) to Mooney viscosity at 100° C. ($ML_{1+4}$) ratio, $Tcp/ML_{1+4}$, of the starting polybutadiene is 2.5 or more, preferably 3 to 5.

It is preferred for the starting polybutadiene to have a toluene solution viscosity (Tcp) ranging from 25 to 600, particularly 60 to 300, and a Mooney viscosity at 100° C. ($ML_{1+4}$) ranging from 10 to 200, particularly 25 to 100.

The molecular weight of the starting polybutadiene is preferably such that the intrinsic viscosity [η] as measured in toluene at 30° C. is 0.1 to 10, particularly 1 to 3. On polystyrene conversion, the molecular weight corresponds to a number average molecular weight (Mn) of $0.2 \times 10^5$ to $10 \times 10^5$, preferably $0.5 \times 10^5$ to $5 \times 10^5$, and a weight average molecular weight (Mw) of $0.5 \times 10^5$ to $20 \times 10^5$, preferably $1 \times 10^5$ to $10 \times 10^5$. A preferred molecular weight distribution in terms of Mw/Mn is 1.5 or greater, particularly 1.6 to 10, especially 1.8 to 5.

The starting polybutadiene can be prepared by, for example, polymerizing butadiene in the presence of a catalyst system comprising (A) a metallocene type complex of a transition metal and (B) an ionic compound composed of a non-coordinating anion and a cation and/or an aluminoxane.

The starting polybutadiene can also be prepared by polymerizing butadiene in the presence of a catalyst system comprising (A) a metallocene type complex of a transition metal, (B1) an ionic compound composed of a non-coordinating anion and a cation, (C) an organometallic compound of an element of the group 1 to 3 of the Periodic Table, and (D) water.

The metallocene type complex of a transition metal as component (A) includes metallocene type complexes of transition metals of the groups 4 to 8 of the Periodic Table, such as the group 4 transition metals (e.g., titanium and zirconium), the group 5 transition metals (e.g., vanadium, niobium or tantalum), the group 6 transition metals (e.g., chromium), and the group 8 transition metals (e.g., cobalt or nickel). CpTiCl$_3$ (Cp: cyclopentadienyl) can be mentioned as an example of the group 4 transition metal metallocene type complex.

Inter alia, metallocene type complexes of the group 5 transition metals are suitable, including the compounds represented by formulae (1) to (6) shown below:

$$RM \cdot L_a \quad (1)$$

$$R_n MX_{2-n} \cdot L_a \quad (2)$$

$$R_n MX_{3-n} \cdot L_a \quad (3)$$

$$RMX_3 \cdot L_a \quad (4)$$

$$RM(O)X_2 \cdot L_a \quad (5)$$

$$R_n MX_{3-n}(NR') \quad (6)$$

wherein n is 1 or 2; and a is 0, 1 or 2.

Preferred of these compounds are $RM \cdot L_a$, $RMX_3 \cdot L_a$, and $RM(O)X_2 \cdot L_a$.

In the formulae, M represents a transition metal of the group 5 of the Periodic Table, such as vanadium (V), niobium (Nb) or tantalum (Ta), with vanadium being preferred.

R represents a cyclopentadienyl group, a substituted cyclopentadienyl group, an indenyl group, a substituted indenyl group, a fluorenyl group or a substituted fluorenyl group.

The substituent in the substituted cyclopentadienyl group, the substituted indenyl group and the substituted fluorenyl group includes a straight-chain or branched aliphatic hydrocarbon group such as methyl, ethyl, propyl, isopropyl, n-butyl, isobutyl, sec-butyl, t-butyl and hexyl; an aromatic hydrocarbon group such as phenyl, tolyl, naphthyl and benzyl; and a silicon-containing hydrocarbon group such as trimethylsilyl. The substituted cyclopentadienyl group further includes those having a cyclopentadienyl ring connected to part of X through a crosslinking group such as dimethylsilyl, dimethylmethylene, methylphenylmethylene, diphenylmethylene, ethylene or substituted ethylene.

X represents a hydrogen atom, a halogen atom, a hydrocarbon group having 1 to 20 carbon atoms, an alkoxy group or an amino group. X's may be the same or different.

The halogen atom includes a fluorine atom, a chlorine atom, a bromine atom, and an iodine atom.

The hydrocarbon group having 1 to 20 carbon atoms includes a straight-chain or branched aliphatic hydrocarbon group such as methyl, ethyl and propyl; an aromatic hydrocarbon group such as phenyl, tolyl, naphthyl and benzyl; and a silicon-containing hydrocarbon group such as trimethylsilyl. Preferred of them are methyl, benzyl, and trimethylsilylmethyl.

The alkoxy group includes methoxy, ethoxy, phenoxy, propoxy, butoxy, amyloxy, hexyloxy, octyloxy, 2-ethylhexyloxy, and thiomethoxy.

Examples of the amino group are dimethylamino, diethylamido, diisopropylamino, and bistrimethylsilylamino.

X preferably represents a hydrogen atom, a fluorine atom, a chlorine atom, a bromine atom, a methyl group, an ethyl group, a methoxy group, an ethoxy group, a dimethylamino group, a diethylamino group, or a bistrimethylsilylamino group.

L represents a Lewis basic compound, i.e., a general organic or inorganic compound exhibiting Lewis basicity that can coordinate to metal. Compounds free of active hydrogen are preferred. Examples of such compounds are ethers, esters, ketones, amines, phosphines, silyloxy compounds, olefins, dienes, aromatic compounds, and alkynes.

NR' represents an imido group, wherein R' is a hydrocarbon substituent having 1 to 25 carbon atoms. Examples of R' include straight-chain or branched aliphatic hydrocarbon groups such as methyl, ethyl, propyl, isopropyl, n-butyl, isobutyl, sec-butyl, t-butyl, hexyl, octyl, and neopentyl; aromatic hydrocarbon groups such as phenyl, tolyl, naphthyl, benzyl, 1-phenylethyl, 2-phenyl-2-propyl, 2,6-dimethylphenyl, and 3,4-dimethylphenyl; and silicon-containing hydrocarbon groups such as trimethylsilyl.

Of the metallocene type complexes of the group 5 transition metals particularly preferred are vanadium compounds (M=V), such as $RV \cdot L_a$, $RVX \cdot L_a$, $R_2V \cdot L_a$, $RVX_2 \cdot L_a$, $R_2VX \cdot L_a$, $RVX_3 \cdot L_a$, $RV(O)X_2 \cdot L_a$, and the like. $RV \cdot L_a$, $RVX_3 \cdot L_a$, and $RV(O)X_2 \cdot L_a$ are especially preferred.

Specific examples of the compound represented by $RMX_3 \cdot L_a$ include the following compound groups (i) to (xvi):

(i) Cyclopentadienylvanadium trichloride and monosubstituted cyclopentadienylvanadium trichloride, such as methylcyclopentadienylvanadium trichloride, ethylcyclopentadienylvanadium trichloride, propylcyclopentadienylvanadium trichloride, and isopropylcyclopentadienylvanadium trichloride.

(ii) 1,2-Disubstituted cyclopentadienylvanadium trichloride, e.g., (1,2-dimethylcyclopentadienyl)vanadium trichloride.

(iia) 1,3-Disubstituted cyclopentadienylvanadium trichloride, e.g., (1,3-dimethylcyclopentadienyl) vanadium trichloride.

(iii) 1,2,3-Trisubstituted cyclopentadienylvanadium trichloride, e.g., (1,2,3-trimethylcyclopentadienyl) vanadium trichloride.

(iv) 1,2,4-Trisubstituted cyclopentadienylvanadium trichloride, e.g., (1,2,4-trimethylcyclopentadienyl) vanadium trichloride.

(v) Tetrasubstituted cyclopentadienylvanadium trichloride, e.g., (1,2,3,4-tetramethylcyclopentadienyl)vanadium trichloride.

(vi) Pentasubstituted cyclopentadienylvanadium trichloride, such as (pentamethylcyclopentadienyl)vanadium trichloride.

(vii) Indenylvanadium trichloride.

(viii) Substituted indenylvanadium trichloride, such as (2-methylindenyl)vanadium trichloride.

(ix) The compounds (i) to (viii) with one to three of the chlorine atoms displaced with an alkoxy group(s) (i.e., monoalkoxides, dialkoxides, trialkoxides), such as cyclopentadienylvanadium tri(t-butoxide), cyclopentadienylvanadium tri(isopropoxide), and cyclopentadienylvanadium dimethoxychloride.

(x) The compounds (i) to (ix) with the chlorine atom(s) substituted with a methyl group(s).

(xi) Compounds in which R and X are bonded via a hydrocarbon group or a silyl group, such as (t-butylamido)dimethylsilyl($\eta^5$-cyclopentadienyl)vanadium dichloride.
(xii) The compounds (xi) with their chlorine atom(s) displaced with a methyl group(s).
(xiii) The compounds (xi) with their chlorine atoms(s) displaced with an alkoxy group(s).
(xiv) The monochloride compounds of the compounds (xiii) with the chlorine atom displaced with a methyl group.
(xv) The compounds (i) to (viii) with their chlorine atom(s) displaced with an amido group(s), such as cyclopentadienyltris(diethylamido)vanadium and cyclopentadienyltris(isopropylamido)vanadium.
(xvi) The compounds (xv) with their chlorine atom displaced with a methyl group. Specific examples of RM(O)X$_2$ include the following compound groups (xvii) to (xx):
(xvii) Cyclopentadienyloxovanadium dichloride and substituted cyclopentadienyloxyvanadium dichloride, such as methylcyclopentadienyloxovanadium dichloride, benzylcyclopentadienyloxovanadium dichloride, and (1,3-dimethylcyclopentadienyl)oxovanadium dichloride. Methylated compounds derived from these compounds by displacing the chlorine atom(s) with a methyl group(s) are also included under this group.
(xviii) Compounds in which R and X are bonded via a hydrocarbon group or a silyl group, such as amidochloride compounds, e.g., (t-butylamido)dimethylsilyl($\eta^5$-cyclopentadienyl)oxovanadium chloride. Methylated compounds derived from these compounds by displacing the chlorine atom(s) with a methyl group(s) are also included under this group.
(xix) Compounds in which at least one of X's is an alkoxy group, such as cyclopentadienyloxovanadium dimethoxide and cyclopentadienyloxovanadium di(isopropoxide). Monochloride compounds of these alkoxide compounds can have the chlorine atom displaced with a methyl group.
(xx) Compounds in which X is an amido group, such as (cyclopentadienyl)bis(diethylamido)oxovanadium.

Of component (B) which constitutes the polymerization catalyst, the ionic compound (B1) is composed of a non-coordinating anion and a cation. The non-coordinating anion includes tetraphenylborate, tetra(fluorophenyl)borate, tetrakis(difluorophenyl)borate, tetrakis(trifluorophenyl)borate, tetrakis(tetrafluorophenyl)borate, and tetrakis(pentafluorophenyl)borate.

The cation includes a carbonium cation, an oxonium cation, an ammonium cation, a phosphonium cation, a cycloheptyltrienyl cation, and a ferrocenium cation having a transition metal.

Examples of the carbonium cation include tri-substituted carbonium cations, e.g., a triphenylcarbonium cation and a tri(substituted phenyl)carbonium cation (e.g., a tri(methylphenyl)carbonium cation and a tri(dimethylphenyl)carbonium cation.

Examples of the ammonium cation include trialkylammonium cations, e.g., a trimethylaammonium cation, a triethylammonium cation, a tripropylammonium cation, a tributylammonium cation, and a tri(n-butyl)ammonium cation; N,N-dialkylanilinium cations, e.g., an N,N-dimethylanilinium cation and an N,N-diethylanilinium cation; and dialkylammonium cations, e.g., a diisopropylammonium cation.

Examples of the phosphonium cation include triarylphosphonium cations, e.g., a triphenylphosphonium cation.

These non-coordinating anions and cations are combined arbitrarily to provide an appropriate ionic compound.

Of the ionic compounds, preferred are triphenylcarbonium tetrakis(pentafluorophenyl)borate, triphenylcarbonium tetrakis(fluorophenyl)borate, N,N-dimethylanilinium tetrakis(pentafluorophenyl)borate, and 1,1'-dimethylferrocenium tetrakis(pentafluorophenyl)borate. These ionic compounds may be used either individually or as a combination of two or more thereof.

An aluminoxane (B2) as component (B) is a compound obtained by bringing an organoaluminum compound into contact with a condensing agent and includes an acyclic aluminoxane represented by formula (—Al(R')O—)$_n$ and a cyclic aluminoxane, wherein R' represents a hydrocarbon group having 1 to 10 carbon atoms, part of which may be substituted with a halogen atom and/or an alkoxy group; and n represents a degree of polymerization of 5 or more, preferably 10 or more). R' preferably represents a methyl, ethyl, propyl or isobutyl group, with a methyl group being preferred. The organoaluminum compound which can be used as a starting material of the aluminoxane includes trialkylaluminum compounds, e.g., trimethylaluminum, triethylaluminum, and triisobutylaluminum, and mixtures thereof. An aluminoxane obtained from a mixture of trimethylaluminum and tributylaluminum is suitable as component (B2).

The condensing agent is typically water. In addition, arbitrary condensing agents causing a trialkylaluminum to condense, such as adsorbed water of an inorganic substance or a diol, can also be used.

In the present invention, polymerization of butadiene can be carried out in the presence of (C) an organometallic compound of the group 1 to 3 element of the Periodic Table in combination with components (A) and (B). Addition of component (C) is effective in increasing the polymerization activity of the catalyst system. The organometallic compound of the group 1 to 3 element includes organoaluminum compounds, organolithium compounds, organomagnesium compounds, organozinc compounds and organoboron compounds.

Examples of the organometallic compound as component (C) are methyllithium, butyllithium, phenyllithium, bistrimethylsilylmethyl lithium, dibutylmagnesium, dihexylmagnesium, diethylzinc, trimethylaluminum, triethylaluminum, triisobutylaluminum, boron trifluoride, and triphenylboron.

Further, organic metal halides, such as ethylmagnesium chloride, dimethylaluminum chloride, diethylaluminum chloride, sesquiethylaluminum chloride, and ethylaluminum dichloride; and organic metal hydrides, such as diethylaluminum hydride and sesquiethylaluminum hydride, are also useful as component (C). These organometallic compounds may be used either individually or as a combination of two or more thereof.

A preferred catalyst system comprises (A) RMX$_3$, e.g., cyclopentadienylvanadium trichloride (CpVCl$_3$), or RM(O)X$_2$, e.g., cyclopentadienyloxovanadium dichloride (CpV(O)Cl$_2$), (B) triphenylcarbonium tetrakis(pentafluorophenyl)borate and (C) a trialkylaluminum, e.g., triethylaluminum.

Where an ionic compound is used as component (B), the above-described aluminoxane may be used as component (C) in combination.

While the ratio of the catalyst components varies depending on various conditions and their combination, a preferred molar ratio of the aluminoxane as component (B) to the metallocene type complex as component (A), (B)/(A), is 1 to 100000, particularly 10 to 10000; a preferred molar ratio of the ionic compound as component (B) to component (A), (B)/(A), is 0.1 to 10, particularly 0.5 to 5; and a preferred molar ratio of component (C) to component (A), (C)/(A), is 0.1 to 10000, particularly 10 to 1000.

It is preferred for the catalyst system to further comprise water as component (D). A preferred component (C) to component (D) molar ratio, (C)/(D), is 0.66 to 5, particularly 0.7 to 1.5.

The order of adding the catalyst components is not particularly restricted.

If desired, hydrogen may be present in the polymerization system for molecular weight regulation. The amount of hydrogen that can be present is preferably not more than 500 mmol, still preferably 50 mmol or less, per mole of butadiene, or preferably not more than 12 liters, still preferably 1.2 liter or less, at 20° C. and 1 atm., per mole of butadiene.

It may be either a part of, or the whole of, butadiene to be polymerized that is added in the polymerization stage before addition of a transition metal catalyst for modification. In the former case, a mixture of the above-described catalyst components can be mixed into the rest of the butadiene monomer or butadiene monomer solution. The rest of the butadiene monomer or butadiene monomer solution is added after completion of this stage of polymerization and before or after addition of a transition metal catalyst hereinafter described.

Butadiene as a monomer can be used in combination with a minor proportion of other monomers. Examples of the other monomers that can be used in combination include other conjugated dienes such as isoprene, 1,3-pentadiene, 2-ethyl-1,3-butadiene, 2,3-dimethylbutadiene, 2-methylpentadiene, 4-methylpentadiene, and 2,4-hexadiene; acyclic monoolefins, e.g., ethylene, propylene, butene-1, butene-2, isobutene, pentene-1, 4-methylpentene-1, hexene-1, and octene-1; cyclic monoolefins, e.g., cyclopentene, cyclohexene, and norbornene; aromatic vinyl compounds, e.g., styrene and α-methylstyrene; and non-conjugated diolefins, e.g., dicyclopentadiene, 5-ethylidene-2-norbornene, and 1,5-hexadiene.

The polymerization method is not particularly limited, and solution polymerization, bulk polymerization, and the like can be adopted. In bulk polymerization, 1,3-butadiene also serves as a polymerization solvent. Useful solvents for solution polymerization include aromatic hydrocarbons, e.g., toluene, benzene, and xylene; aliphatic hydrocarbons, e.g., n-hexane, butane, heptane, and pentane; alicyclic hydrocarbons, e.g., cyclopentane and cyclohexane; olefinic hydrocarbons, e.g., 1-butene and 2-butene; hydrocarbon solvents, such as mineral spirit, solvent naphtha and kerosine; and halogenated hydrocarbons, e.g., methylene chloride.

In the present invention, it is preferred that the monomer be preliminarily polymerized at a prescribed temperature in the presence of the above-described catalyst. Preliminary polymerization is carried out by gas phase polymerization, solution polymerization, slurry polymerization, bulk polymerization, and the like. The solid or solution obtained by the preliminary polymerization is then subjected to main polymerization either after once isolated or as produced.

The polymerization is preferably carried out at −100 to 200° C., particularly −50 to 120° C., for 2 minutes to 12 hours, particularly 5 minutes to 6 hours.

After the reaction accomplishes a predetermined polymerization ratio, a transition metal catalyst is added to the reaction system thereby to modify the polymer chain.

The transition metal catalyst which can be used in the present invention is preferably a system comprising (1) a transition metal compound, (2) an organoaluminum compound and (3) water.

The transition metal compound of the transition metal catalyst includes titanium compounds, zirconium compounds, vanadium compounds, chromium compounds, manganese compounds, iron compounds, ruthenium compounds, cobalt compounds, nickel compounds, palladium compounds, copper compounds, silver compounds, and zinc compounds, with cobalt compounds being preferred.

The cobalt compounds preferably include salts or complexes of cobalt. Suitable examples of the cobalt salts are cobalt chloride, cobalt bromide, cobalt nitrate, cobalt octylate, cobalt naphthenate, cobalt versatate, cobalt acetate, and cobalt malonate. Suitable examples of the cobalt complexes are bisacetylacetonatocobalt, trisacetylacetonatocobalt, bis(ethyl acetoacetato)cobalt, an organic base complex of halogenated cobalt, such as a triarylphosphine complex, a trialkylphosphine complex, a pyridine complex and a picoline complex, and an ethyl alcohol complex of halogenated cobalt.

Preferred of these cobalt compounds are cobalt octylate, cobalt naphthenate, cobalt versatate, bisacetylacetonatocobalt, and trisacetylacetonatecobalt.

The organoaluminum compound of the transition metal catalyst includes trialkylaluminums, such as trimethylaluminum, triethylaluminum, triisobutylaluminum, trihexylaluminum, trioctylaluminum, and tridecylaluminum; dialkylaluminum halides, such as dimethylaluminum chloride, dimethylaluminum bromide, diethylaluminum chloride, diethylaluminum bromide, diethylaluminum iodide, dibutylaluminum chloride, dibutylaluminum bromide, and dibutylaluminum iodide; alkylaluminum sesquihalides, such as methylaluminum sesquichloride, methylaluminum sesquibromide, ethylaluminum sesquichloride, and ethylaluminum sesquibromide; and monoalkylaluminum halides, such as methylaluminum dichloride, methylaluminum dibromide, ethylaluminum dichloride, ethylaluminum dibromide, butylaluminum dichloride, and butylaluminum dibromide. These aluminum compounds can be used either individually or as a mixture of two or more thereof. Diethylaluminum chloride is particularly preferred of them.

While the amount of the transition metal compound, such as the cobalt compound, to be used is subject to variation in a broad range according to a desired degree of branching, it is preferably from $1\times10^{-7}$ to $1\times10^{-3}$ mol, particularly $5\times10^{-7}$ to $1\times10^{-4}$ mol, per mol of butadiene existing at the modifying reaction.

The amount of the organoaluminum compound to be used is also subject to variation in a broad range according to a desired degree of branching but is preferably from $1\times10^{-5}$ to $5\times10^{-2}$ mol, particularly $5\times10^{-5}$ to $1\times10^{-2}$ mol, per mole of butadiene existing at the modifying reaction.

Water is used in any amount according to a desired degree of branching. It is preferably added in an amount not more than 1.5 mol, particularly 1 mol or less, per mole of the organoaluminum compound.

After polymerization is carried out for a prescribed period of time, an inhibitor, such as an alcohol, is added to the reaction system to cease the polymerization. If necessary, the pressure in the polymerization tank is liberated. The resulting modified polybutadiene is worked up by washing, drying, and the like.

The modified polybutadiene according to the present invention desirably has a Tcp/ML$_{1+4}$ ratio of 3 or less, more desirably 0.9 to 3, most desirably 1.2 to 2.5.

The modified polybutadiene preferably has a Tcp of 30 to 300, particularly 45 to 200. The modified polybutadiene preferably has an $ML_{1+4}$ (100° C.) of 10 to 200, particularly 25 to 100. The modified polybutadiene preferably has a cold flow rate (CF) less than 20 mg/min, particularly less than 15 mg/min.

The present invention will now be illustrated in greater detail with reference to Examples, but it should be understood that the invention is not construed as being limited thereto. The microstructure, intrinsic viscosity [η], toluene solution viscosity (Tcp), Mooney viscosity ($ML_{1+4}$, 100° C.), and cold flow rate (CF) of polybutadiene were measured as follows.

1) Microstructure

The microstructure of polybutadiene was determined by calculation from the intensity ratio of absorptions at 740 $cm^{-1}$ for cis-1,4-structure, 967 $cm^{-1}$ for trans-1,4-structure and 910 $cm^{-1}$ for 1,2-structure (vinyl) in infrared absorption spectroscopy.

2) Intrinsic Viscosity [η]

Measured at 30° C. in a toluene solution.

3) Tcp

A polymer weighing 2.28 g was dissolved in 50 ml of toluene, and the viscosity of the toluene solution was measured with a Canon Fenske viscometer No. 400 at 25° C. A viscometer-correction standard liquid specified in JIS Z8809 was used as a reference solution.

4) $ML_{1+4}$, 100° C.

Measured in accordance with JIS K6300.

5) CF

A polymer, kept at 50° C., was sucked in a glass tube having an inner diameter of 6.4 mm by a pressure difference of 180 mmHg. The weight of the polymer sucked up was divided by 10 minutes to obtain a cold flow rate (CF; mg/min).

SYNTHESIS EXAMPLE 1

Preparation of Starting Polybutadiene

Into a 1.7-l autoclave purged with nitrogen were charged 260 ml of cyclohexane and 140 ml of butadiene and stirred. To the mixture was added 6 μl of water, followed by stirring for 30 minutes. Hydrogen gas was introduced into the autoclave in an amount of 90 ml as measured at 20° C. and 1 atm. with an integrating mass flow meter. Then 0.36 ml of a 1 mol/l toluene solution of triethylaluminum (TEA). After 3 minutes stirring, 0.4 ml of a 5 mmol/l toluene solution of cyclopentadienylvanadium trichloride ($CPVCl_3$) and 1.2 ml of a 2.5 mmol/l toluene solution of triphenylcarbonium tetrakis-(pentafluorophenyl)borate ($Ph_3CB(C_6F_5)_4$) were added thereto in this order to perform polymerization at 40° C. for 30 minutes. After completion of the reaction, ethanol containing 2,6-di-t-butyl-p-cresol was added to stop the reaction, and the solvent was removed by evaporation to give 40 g of polybutadiene. The polybutadiene of Synthesis Example 1 is regarded as a starting polybutadiene in Examples 1 to 7 and Comparative Examples 1 and 2. The physical properties of the resulting polymer is shown in Table 2.

EXAMPLE 1

Preparation of Modified Polybutadiene

Butadiene was polymerized in the same manner as in Synthesis Example 1 (40° C.×30 min). To the reaction mixture were added 4.2 ml of toluene containing 300 mg/l of water, 4 ml of a 1 mol/l toluene solution of diethylaluminum chloride (DEAC), and 2 ml of a 5 mmol/l toluene solution of cobalt octylate ($Co(Oct)_2$), and the system was allowed to react at 40° C. for 10 minutes. After the reaction, ethanol containing 2,6-di-t-butyl-p-cresol was added to cease the reaction, and the solvent was removed by evaporation to give modified polybutadiene. The polymerization results are shown in Tables 1 and 2.

EXAMPLE 2

Preparation of Modified Polybutadiene

The same procedure of Example 1 was followed, except that the amount of the water-containing toluene (300 mg/l) added after polymerization was changed to 8.4 ml. The results of polymerization are shown in Tables 1 and 2.

EXAMPLE 3

Preparation of Modified Polybutadiene

The same procedure of Example 1 was followed, except that 5 μl of water was added after polymerization in place of the water-containing (300 mg/l) toluene. The results of polymerization are shown in Tables 1 and 2.

EXAMPLE 4

Preparation of Modified Polybutadiene

The same procedure of Example 1 was followed, except that 10 μl of water was added after polymerization in place of the water-containing (300 mg/l) toluene. The results of polymerization are shown in Tables 1 and 2.

EXAMPLE 5

Preparation of Modified Polybutadiene

The same procedure of Example 2 was followed, except for changing the modifying reaction time after the polymerization was changed to 5 minutes. The results of polymerization are shown in Tables 1 and 2.

EXAMPLE 6

Preparation of Modified Polybutadiene

The same procedure of Example 3 was followed, except for changing the modifying reaction time after the polymerization was changed to 5 minutes. The results of polymerization are shown in Tables 1 and 2.

EXAMPLE 7

Preparation of Modified Polybutadiene

The same procedure of Example 3 was followed, except for changing the modifying reaction time after the polymerization was changed to 15 minutes. The results of polymerization are shown in Tables 1 and 2.

COMPARATIVE EXAMPLE 1

Preparation of Polybutadiene

Butadiene was polymerized in the same manner as in Synthesis Example 1 (40° C.×30 min). Without adding anything, the stirring was continued for an additional 10 minute period (total polymerization time: 40 minutes). The results of polymerization are shown in Tables 1 and 2.

COMPARATIVE EXAMPLE 2

Preparation of Polybutadiene

The procedure of Example 1 was followed, except that cobalt octylate was not added after the polymerization. The results of polymerization are shown in Tables 1 and 2.

SYNTHESIS EXAMPLE 2

Preparation of Starting Polybutadiene

Into a 1.7-l autoclave purged with nitrogen were charged 260 ml of cyclohexane and 140 ml of butadiene and stirred. To the mixture was added 6 µl of water, followed by stirring for 30 minutes. Hydrogen gas was introduced into the autoclave in an amount of 95 ml as measured at 20° C. and 1 atm. with an integrating mass flow meter. Then 0.36 ml of a 1 mol/l toluene solution of triethylaluminum (TEA). After 3 minutes stirring, 0.42 ml of a 5 mmol/l toluene solution of cyclopentadienylvanadium trichloride ($CpVCl_3$) and 1.25 ml of a 2.5 mmol/l toluene solution of triphenylcarbonium tetrakis(pentafluorophenyl)borate ($Ph_3CB(C_6F_5)_4$) were added thereto in this order to perform polymerization at 40° C. for 30 minutes. After the reaction, ethanol containing 2,6-di-t-butyl-p-cresol was added to stop the reaction, and the solvent was removed by evaporation to give 41 g of polybutadiene. The physical properties of the resulting polymer are shown in Table 4. The polybutadiene synthesized in Synthesis Example 2 is regarded as a starting polybutadiene in Examples 8 to 11 and Comparative Example 3.

EXAMPLE 8

Preparation of Modified Polybutadiene

Butadiene was polymerized in the same manner as in Synthesis Example 2 (40° C.×30 min). To the reaction mixture were added 8.4 ml of toluene containing 300 mg/l of water, 2 ml of a 1 mol/l toluene solution of diethylaluminum chloride (DEAC), and 1 ml of a 5 mmol/l toluene solution of cobalt octylate ($Co(Oct)_2$), and the system was allowed to react at 40° C. for 5 minutes. After the reaction, ethanol containing 2,6-di-t-butyl-p-cresol was added to cease the reaction, and the solvent was removed by evaporation to give modified polybutadiene. The polymerization results are shown in Tables 3 and 4.

EXAMPLE 9

Preparation of Modified Polybutadiene

The same procedure of Example 8 was followed, except that 5 µl of water was added after polymerization in place of the water-containing (300 mg/l) toluene. The results of polymerization are shown in Tables 3 and 4.

EXAMPLE 10

Preparation of Modified Polybutadiene

The same procedure of Example 8 was followed, except that 8 µl of water was added after polymerization in place of the water-containing (300 mg/l) toluene. The results of polymerization are shown in Tables 3 and 4.

EXAMPLE 11

Preparation of Modified Polybutadiene

The same procedure of Example 9 was followed, except for changing the amounts of the toluene solution of diethylaluminum chloride (DEAC) and the toluene solution of cobalt octylate ($Co(Oct)_2$) to 1 ml and 0.5 ml, respectively. The results of polymerization are shown in Tables 3 and 4.

COMPARATIVE EXAMPLE 3

Preparation of Polybutadiene

Butadiene was polymerized in the same manner as in Synthesis Example 2 (40° C.×30 min). Without adding anything, the stirring was continued for an additional 5 minute period (total polymerization time: 35 minutes). The results of polymerization are shown in Tables 3 and 4.

SYNTHESIS EXAMPLE 3

Preparation of Starting Polybutadiene

Into a 1.7-l autoclave purged with nitrogen were charged 260 ml of cyclohexane and 140 ml of butadiene and stirred. To the mixture was added 5 µl of water, followed by stirring for 30 minutes. Hydrogen gas was introduced into the autoclave in an amount of 100 ml as measured at 20° C. and 1 atm. with an integrating mass flow meter. Then 0.36 ml of a 1 mol/l toluene solution of triethylaluminum (TEA). After 3 minutes stirring, 0.5 ml of a 5 mmol/l toluene solution of cyclopentadienylvanadium trichloride ($CpVCl_3$) and 1.5 ml of a 2.5 mmol/l toluene solution of triphenylcarbonium tetrakis(pentafluorophenyl)borate ($Ph_3CB(C_6F_5)_4$) were added thereto in this order to perform polymerization at 40° C. for 30 minutes. After the reaction, ethanol containing 2,6-di-t-butyl-p-cresol was added to stop the reaction, and the solvent was removed by evaporation to give 40 g of polybutadiene. The physical properties of the resulting polybutadiene are shown in Table 6. The resulting polybutadiene is regarded as a starting polybutadiene in Examples 12 to 16.

EXAMPLE 12

Preparation of Modified Polybutadiene

Butadiene was polymerized in the same manner as in Synthesis Example 3 (40° C.×30 min), except for changing the amount of hydrogen introduced to 115 ml as measured at 20° C. and 1 atm. To the reaction mixture were added 10 ml of toluene containing 300 mg/l of water, 0.2 ml of a 1 mol/l toluene solution of diethylaluminum chloride (DEAC), and 0.5 ml of a 5 mmol/l toluene solution of cobalt octylate ($Co(Oct)_2$), and the system was allowed to react at 40° C. for 15 minutes. After the reaction, ethanol containing 2,6-di-t-butyl-p-cresol was added to cease the reaction, and the solvent was removed by evaporation to give modified polybutadiene. The polymerization results are shown in Tables 5 and 6.

EXAMPLE 13

Preparation of Modified Polybutadiene

The same procedure of Example 12 was followed, except for changing the amount of hydrogen introduced to 130 ml as measured at 20° C. and 1 atm., adding 7 µl of water after polymerization in place of the water-containing toluene (300 mg/l), and changing the amount of the toluene solution of DEAC to 0.5 ml. The results of polymerization are shown in Tables 5 and 6.

EXAMPLE 14

Preparation of Modified Polybutadiene

Into a 1.7-l autoclave purged with nitrogen were charged 260 ml of cyclohexane and 140 ml of butadiene and stirred. To the mixture was added 5 µl of water, followed by stirring for 30 minutes. Hydrogen gas was introduced into the autoclave in an amount of 110 ml as measured at 20° C. and 1 atm. with an integrating mass flow meter. Then 0.36 ml of a 1 mol/l toluene solution of triethylaluminum (TEA). After 3 minutes stirring, 0.5 ml of a 5 mmol/l toluene solution of cyclopentadienylvanadium trichloride (CpVCl$_3$) and 1.5 ml of a 2.5 mmol/l toluene solution of triphenylcarbonium tetrakis(pentafluorophenyl)borate (Ph$_3$CB(C$_6$F$_5$)$_4$) were added thereto in this order to perform polymerization at 40° C. for 30 minutes. Further, 4.8 ml of toluene containing 300 mg/l of water, 0.1 ml of a 1 mol/l toluene solution of diethylaluminum chloride (DEAC), and 0.5 ml of a 5 mmol/l toluene solution of cobalt octylate (Co(Oct)$_2$), and the system was allowed to react at 40° C. for 30 minutes. After the reaction, ethanol containing 2,6-di-t-butyl-p-cresol was added to cease the reaction, and the solvent was removed by evaporation to give modified polybutadiene. The polymerization results are shown in Tables 5 and 6.

EXAMPLE 15

Preparation of Modified Polybutadiene

The same procedure of Example 14 was followed, except for changing the amount of hydrogen introduced to 140 ml as measured at 20° C. and 1 atm., adding 5 μl of water after polymerization in place of the water-containing (300 mg/l) toluene, and changing the amount of the toluene solution of DEAC to 0.3 ml. The results of polymerization are shown in Tables 5 and 6.

EXAMPLE 16

Preparation of Modified Polybutadiene

The same procedure of Example 15 was followed, except for changing the amount of water added after polymerization to 8 μl and changing the amount of the toluene solution of DEAC to 0.5 ml. The results of polymerization are shown in Tables 5 and 6.

SYNTHESIS EXAMPLE 4

Preparation of Starting Polybutadiene

Into a 1.7-l autoclave purged with nitrogen were charged 260 ml of cyclohexane and 140 ml of butadiene and stirred. To the mixture was added 5.4 μl of water, followed by stirring for 30 minutes. Hydrogen gas was introduced into the autoclave in an amount of 100 ml as measured at 20° C. and 1 atm. with an integrating mass flow meter. Then 0.36 ml of a 1 mol/l toluene solution of triethylaluminum (TEA). After 3 minutes stirring, 0.5 ml of a 5 mmol/l toluene solution of cyclopentadienylvanadium trichloride (CpVCl$_3$) and 1.5 ml of a 2.5 mmol/l toluene solution of triphenyl-carbonium tetrakis(pentafluorophenyl)borate (Ph$_3$CB(C$_6$F$_5$)$_4$) were added thereto in this order to perform polymerization at 40° C. for 30 minutes. After the reaction, ethanol containing 2,6-di-t-butyl-p-cresol was added to stop the reaction, and the solvent was removed by evaporation to give 42 g of polybutadiene. The physical properties of the resulting polybutadiene are shown in Table 8. The resulting polybutadiene is regarded as a starting polybutadiene in Examples 17 to 22.

EXAMPLE 17

Preparation of Modified Polybutadiene

Butadiene was polymerized in the same manner as in Synthesis Example 4 (40° C.×30 min), except for changing the amount of hydrogen introduced to 110 ml as measured at 20° C. and 1 atm. To the reaction mixture were added 6 μl of water, 1.0 ml of a 1 mol/l toluene solution of diethylaluminum chloride (DEAC), and 0.5 ml of a 5 mmol/l toluene solution of cobalt octylate (Co(Oct)$_2$), and the system was allowed to react at 40° C. for 15 minutes. After the reaction, ethanol containing 2,6-di-t-butyl-p-cresol was added to cease the reaction, and the solvent was removed by evaporation to give modified polybutadiene. The polymerization results are shown in Tables 7 and 8.

EXAMPLE 18

Preparation of Modified Polybutadiene

The same procedure of Example 17 was followed, except for changing the amount of hydrogen introduced to 125 ml as measured at 20° C. and 1 atm. and additionally feeding 31 g (50 ml) of 1,3-butadiene after the polymerization. The results of polymerization are shown in Tables 7 and 8.

EXAMPLE 19

Preparation of Modified Polybutadiene

The same procedure of Example 17 was followed, except for changing the amount of hydrogen introduced to 130 ml as measured at 20° C. and 1 atm. and additionally feeding 62 g is (100 ml) of 1,3-butadiene after the polymerization. The results of polymerization are shown in Tables 7 and 8.

EXAMPLE 20

Preparation of Modified Polybutadiene

The same procedure of Example 17 was followed, except for changing the amount of hydrogen introduced to 100 ml as measured at 20° C. and 1 atm. and changing the amounts of the water-containing toluene solution, the DEAC toluene solution, and the cobalt octylate toluene solution to 4.2 ml, 0.1 ml, and 0.5 ml, respectively. The results of polymerization are shown in Tables 7 and 8.

EXAMPLE 21

Preparation of Modified Polybutadiene

The same procedure of Example 20 was followed, except for changing the amount of hydrogen introduced to 105 ml as measured at 20° C. and 1 atm. and additionally feeding 31 g (50 ml) of 1,3-butadiene after the polymerization. The results of polymerization are shown in Tables 7 and 8.

EXAMPLE 22

Preparation of Modified Polybutadiene

The same procedure of Example 20 was followed, except for changing the amount of hydrogen introduced to 105 ml as measured at 20° C. and 1 atm. and additionally feeding 62 g (100 ml) of 1,3-butadiene after the polymerization. The results of polymerization are shown in Tables 7 and 8.

TABLE 1

|  | H₂O (mmol) | DEAC (mmol) | Co(Oct)₂ (μmol) | Reaction Temp. (° C.) | Reaction Time (min) | Yield (g) |
| --- | --- | --- | --- | --- | --- | --- |
| Example 1 | 0.07 | 4 | 10 | 40 | 10 | 43 |
| Example 2 | 0.14 | 4 | 10 | 40 | 10 | 44 |
| Example 3 | 0.28 | 4 | 10 | 40 | 10 | 45 |
| Example 4 | 0.56 | 4 | 10 | 40 | 10 | 44 |
| Example 5 | 0.14 | 4 | 10 | 40 | 5 | 40 |
| Example 6 | 0.28 | 4 | 10 | 40 | 5 | 42 |
| Example 7 | 0.28 | 4 | 10 | 40 | 15 | 40 |
| Comparative Example 1 | 0 | 0 | 0 | 40 | 10 | 47 |
| Comparative Example 2 | 0.28 | 4 | 0 | 40 | 10 | 47 |

TABLE 2

|  | Microstructure (%) | | | [η] | Tcp | ML$_{1+4}$ | Tcp/ML$_{1+4}$ | CF (mg/min) |
| --- | --- | --- | --- | --- | --- | --- | --- | --- |
|  | cis | trans | 1,2- | | | | | |
| Syn. Ex. 1 | 87.6 | 1.3 | 11.1 | 2.30 | 105.4 | 35.1 | 3.0 | 28.2 |
| Ex. 1 | 87.8 | 0.8 | 11.4 | 2.31 | 107.0 | 40.8 | 2.6 | 14.7 |
| Ex. 2 | 87.8 | 0.9 | 11.3 | 2.25 | 96.4 | 40.5 | 2.4 | 14.9 |
| Ex. 3 | 87.6 | 1.2 | 11.2 | 2.40 | 118.7 | 55.9 | 2.1 | 3.9 |
| Ex. 4 | 88.2 | 1.3 | 10.5 | 2.03 | 55.0 | 50.6 | 1.1 | 1.7 |
| Ex. 5 | 87.8 | 0.9 | 11.3 | 2.21 | 88.3 | 37.7 | 2.3 | 17.6 |
| Ex. 6 | 87.7 | 1.0 | 11.3 | 2.38 | 118.1 | 48.5 | 2.4 | 9.5 |
| Ex. 7 | 87.4 | 1.4 | 11.2 | 2.08 | 63.6 | 37.5 | 1.7 | 11.1 |
| Comp. Ex. 1 | 87.5 | 1.0 | 11.5 | 2.38 | 117.8 | 37.8 | 3.1 | 24.1 |
| Comp. Ex. 2 | 87.6 | 1.1 | 11.3 | 2.53 | 146.6 | 42.4 | 3.5 | 17.6 |

TABLE 3

|  | H₂O (mmol) | DEAC (mmol) | Co(Oct)₂ (μmol) | Reaction Temp. (° C.) | Reaction Time (min) | Yield (g) |
| --- | --- | --- | --- | --- | --- | --- |
| Ex. 8 | 0.14 | 2 | 5 | 40 | 5 | 42 |
| Ex. 9 | 0.28 | 2 | 5 | 40 | 5 | 47 |
| Ex. 10 | 0.44 | 2 | 5 | 40 | 5 | 49 |
| Ex. 11 | 0.28 | 1 | 2.5 | 40 | 5 | 40 |
| Comp. Ex. 3 | 0 | 0 | 0 | 40 | 5 | 45 |

TABLE 4

|  | Microstructure (%) | | | [η] | Tcp | ML$_{1+4}$ | Tcp/ML$_{1+4}$ | CF (mg/min) |
| --- | --- | --- | --- | --- | --- | --- | --- | --- |
|  | cis | trans | 1,2- | | | | | |
| Syn. Ex. 2 | 87.6 | 1.2 | 11.2 | 2.42 | 126.0 | 39.4 | 3.2 | 21.9 |
| Ex. 8 | 87.8 | 0.8 | 11.4 | 2.47 | 134.2 | 48.1 | 2.8 | 11.5 |
| Ex. 9 | 87.9 | 0.9 | 11.2 | 2.49 | 138.6 | 59.9 | 2.3 | 3.0 |
| Ex. 10 | 87.9 | 0.9 | 11.2 | 2.50 | 139.9 | 67.9 | 2.1 | 1.1 |
| Ex. 11 | 87.8 | 1.1 | 11.1 | 2.23 | 90.9 | 45.9 | 2.0 | 6.4 |
| Comp. Ex. 3 | 87.7 | 0.8 | 11.5 | 2.60 | 158.3 | 44.1 | 3.6 | 19.0 |

TABLE 5

|  | H₂ (ml) | H₂O (ml) | DEAC (mmol) | Co(Oct)₂ (μmol) | Reaction Temp. (° C.) | Reaction Time (min) | Yield (g) |
| --- | --- | --- | --- | --- | --- | --- | --- |
| Ex. 12 | 115 | 0.17 | 0.2 | 2.5 | 40 | 15 | 43 |
| Ex. 13 | 130 | 0.39 | 0.5 | 2.5 | 40 | 15 | 48 |
| Ex. 14 | 110 | 0.08 | 0.1 | 2.5 | 40 | 30 | 39 |
| Ex. 15 | 140 | 0.28 | 0.3 | 2.5 | 40 | 30 | 48 |
| Ex. 16 | 140 | 0.44 | 0.5 | 2.5 | 40 | 30 | 43 |

TABLE 6

| | Microstructure (%) | | | | | | | CF |
|---|---|---|---|---|---|---|---|---|
| | cis | trans | 1,2- | $[\eta]$ | Tcp | $ML_{1+4}$ | $Tcp/ML_{1+4}$ | (mg/min) |
| Syn. Ex. 3 | 87.8 | 1.0 | 11.2 | 2.49 | 138.0 | 39.2 | 3.5 | 24.8 |
| Ex. 12 | 88.3 | 0.9 | 10.8 | 2.30 | 103.9 | 50.6 | 2.1 | 5.5 |
| Ex. 13 | 88.1 | 1.2 | 10.7 | 2.10 | 68.6 | 34.8 | 2.0 | 17.9 |
| Ex. 14 | 87.3 | 1.3 | 11.4 | 2.36 | 115.5 | 38.5 | 3.0 | 21.8 |
| Ex. 15 | 88.0 | 1.0 | 11.0 | 2.31 | 106.6 | 45.3 | 2.4 | 9.9 |
| Ex. 16 | 87.6 | 1.2 | 11.2 | 2.16 | 78.3 | 37.2 | 2.1 | 15.9 |

TABLE 7

| | $H_2$ (ml) | Additional Monomer (g) | $H_2O$ (mmol) | DEAC (mmol) | $Co(Oct)_2$ ($\mu$mol) | Reaction Time (min) | Yield (g) |
|---|---|---|---|---|---|---|---|
| Ex. 17 | 110 | 0 | 0.33 | 1.0 | 2.5 | 15 | 46 |
| Ex. 18 | 125 | 31 | 0.33 | 1.0 | 2.5 | 15 | 50 |
| Ex. 19 | 130 | 62 | 0.33 | 1.0 | 2.5 | 15 | 59 |
| Ex. 20 | 100 | 0 | 0.07 | 0.1 | 2.5 | 15 | 48 |
| Ex. 21 | 105 | 31 | 0.07 | 0.1 | 2.5 | 15 | 50 |
| Ex. 22 | 105 | 62 | 0.07 | 0.1 | 2.5 | 15 | 53 |

TABLE 8

| | Microstructure (%) | | | | | | | CF |
|---|---|---|---|---|---|---|---|---|
| | cis | trans | 1,2- | $[\eta]$ | Tcp | $ML_{1+4}$ | $Tcp/ML_{1+4}$ | (mg/min) |
| Syn. Ex. 4 | 87.8 | 1.0 | 11.2 | 2.14 | 74.4 | 26.1 | 2.9 | 59.3 |
| Ex. 17 | 88.7 | 0.9 | 10.4 | 2.25 | 95.3 | 39.7 | 2.4 | 15.3 |
| Ex. 18 | 89.7 | 1.0 | 9.3 | 2.06 | 61.5 | 35.2 | 1.7 | 15.0 |
| Ex. 19 | 91.0 | 1.0 | 8.0 | 2.35 | 113.2 | 58.1 | 1.9 | 2.7 |
| Ex. 20 | 88.2 | 0.9 | 10.9 | 2.22 | 89.8 | 38.6 | 2.3 | 16.1 |
| Ex. 21 | 89.1 | 1.0 | 9.9 | 2.24 | 92.3 | 38.9 | 2.4 | 16.1 |
| Ex. 22 | 90.2 | 1.0 | 8.8 | 2.30 | 104.5 | 47.5 | 2.2 | 7.7 |

As is apparent from the foregoing Examples, the modified polybutadiene according to the present invention has a reduced linearity and improved cold flow properties as compared with the starting highly linear polybutadiene while retaining the microstructure of the starting polybutadiene having a high cis- 1,4-structure with a moderate proportion of a 1,2-structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for producing modified polybutadiene comprising preparing starting polybutadiene having a $Tcp/ML_{1+4}$ ratio of 2.5 or more, wherein Tcp is a 5% toluene solution viscosity at 25° C., and $ML_{1+4}$ is a Mooney viscosity at 100° C., by using a polymerization catalyst system comprising (A) a metallocene type complex of a transition metal and (B) at least one of (B1) an ionic compound composed of a non-coordinating anion and a cation and (B2) an aluminoxane and modifying said starting polybutadiene by addition of a transition metal catalyst.

2. The process for producing modified polybutadiene according to claim 1, wherein an additional amount of a butadiene monomer is added before or after the addition of said transition metal catalyst.

3. The process for producing modified polybutadiene according to claim 1, wherein said transition metal catalyst comprises (1) a cobalt compound, (2) an organoaluminum compound, and (3) water.

4. A process for producing modified polybutadiene comprising preparing starting polybutadiene having a $Tcp/ML_{1+4}$ ratio of 2.5 or more, wherein Tcp is a 5% toluene solution viscosity at 25° C., and $ML_{1+4}$ is a Mooney viscosity at 100° C., by using a polymerization catalyst system comprising (A) a metallocene type complex of a transition metal, (B1) an ionic compound composed of a non-coordinating anion and a cation, (C) an organometallic compound of an element of the group 1 to 3 of the Periodic Table, and (D) water and modifying said starting polybutadiene by addition of a transition metal catalyst.

5. The process for producing modified polybutadiene according to claim 4, wherein an additional amount of a butadiene monomer is added before or after the addition of said transition metal catalyst.

6. The process for producing modified polybutadiene according to claim 4, wherein said transition metal catalyst comprises (1) a cobalt compound, (2) an organoaluminum compound, and (3) water.

* * * * *